(12) United States Patent
Parsley et al.

(10) Patent No.: US 11,269,400 B2
(45) Date of Patent: Mar. 8, 2022

(54) POSITIONING SYSTEM

(71) Applicant: Mo-Sys Engineering Limited, London (GB)

(72) Inventors: Martin Peter Parsley, London (GB); Michael Paul Alexander Geissler, London (GB)

(73) Assignee: Mo—Sys Engineering Limited, London (GB)

(*) Notice: Subject to any disclaimer, the term of this patent is extended or adjusted under 35 U.S.C. 154(b) by 0 days.

(21) Appl. No.: 16/634,124

(22) PCT Filed: Jul. 27, 2018

(86) PCT No.: PCT/GB2018/052129
§ 371 (c)(1),
(2) Date: Jan. 24, 2020

(87) PCT Pub. No.: WO2019/021018
PCT Pub. Date: Jan. 31, 2019

(65) Prior Publication Data
US 2020/0209953 A1 Jul. 2, 2020

(30) Foreign Application Priority Data

Jul. 27, 2017 (GB) ..................................... 1712135

(51) Int. Cl.
G06F 3/0481 (2013.01)
G06F 3/0346 (2013.01)
(Continued)

(52) U.S. Cl.
CPC .......... *G06F 3/011* (2013.01); *G02B 27/0172* (2013.01); *G06F 3/017* (2013.01);
(Continued)

(58) Field of Classification Search
CPC . G06F 3/011; G06F 3/017; G06T 7/74; G06T 7/20; G06T 17/20; G06T 19/006;
(Continued)

(56) References Cited

U.S. PATENT DOCUMENTS

| | | | |
|---|---|---|---|
| 2015/0023669 A1* | 1/2015 | Jiang | H04B 10/116 398/118 |
| 2016/0005185 A1* | 1/2016 | Geissler | G06T 7/579 348/47 |

(Continued)

FOREIGN PATENT DOCUMENTS

| | | |
|---|---|---|
| WO | 2014132090 A2 | 9/2014 |
| WO | 2015176163 A1 | 11/2015 |

OTHER PUBLICATIONS

A. R. Silva, L. Valente, E. Clua and B. Feijo, "An Indoor Navigation System for Live-Action Virtual Reality Games," 2015 14th Brazilian Symposium on Computer Games and Digital Entertainment (SBGames), Piaui, Brazil, 2015, pp. 1-10, doi: 10.1109/SBGames.2015.29. (Year: 2015).*

(Continued)

*Primary Examiner* — Jennifer N Welch
*Assistant Examiner* — Kc Chen
(74) *Attorney, Agent, or Firm* — Haynes and Boone, LLP

(57) ABSTRACT

A motion tracking system configured to determine a rendering of a simulation object representing a real object (1) in a real environment (5, 6, 7, 8, 9), the positioning system comprising: an imaging device (24) mounted to the real object and configured to capture a series of images of a plurality of irregularly positioned markers (30) located in the real environment; an image processing unit communicatively coupled to the imaging device for receiving the series of images; the image processing unit being configured to determine the real location of the real object by: creating a three-dimensional model of a constellation formed by the (Continued)

markers visible in the series of images; and mapping the patterns of markers visible in successive images captured by the imaging device to the model and thereby determining the motion of the imaging device relative to the markers; and to determine the rendering of the simulation object so that the rendering mimics the determined motion of the imaging device.

20 Claims, 2 Drawing Sheets

(51) Int. Cl.
| | | |
|---|---|---|
| G06F 3/0338 | (2013.01) | |
| G06F 3/01 | (2006.01) | |
| G06T 7/50 | (2017.01) | |
| G06T 7/73 | (2017.01) | |
| G02B 27/01 | (2006.01) | |
| G06T 7/20 | (2017.01) | |
| G06T 17/20 | (2006.01) | |
| G06T 19/00 | (2011.01) | |

(52) U.S. Cl.
CPC .............. *G06T 7/20* (2013.01); *G06T 7/74* (2017.01); *G06T 17/20* (2013.01); *G06T 19/006* (2013.01); *G02B 2027/0138* (2013.01)

(58) Field of Classification Search
CPC ........... G06T 7/246; G06T 7/75; G06T 7/579; G06T 2207/10016; G06T 2207/30204; G06T 2207/30241; G06T 2207/30244; G06T 7/251; G06T 7/248; G02B 27/0172; G02B 2027/0138
See application file for complete search history.

(56) References Cited

U.S. PATENT DOCUMENTS

| | | | |
|---|---|---|---|
| 2017/0011553 A1* | 1/2017 | Chen | G06F 3/005 |
| 2017/0249745 A1* | 8/2017 | Fiala | A63F 13/25 |
| 2018/0046874 A1* | 2/2018 | Guo | G06K 9/3208 |
| 2019/0108668 A1* | 4/2019 | Shenton | A63F 13/215 |

OTHER PUBLICATIONS

International Search Report and Written Opinion from PCT Application No. PCT/GB2018/052129, dated Oct. 29, 2018 pp. 1-13 (MOS01-130261PC).

* cited by examiner

POSITIONING SYSTEM

RELATED APPLICATIONS

This application is a 371 National Stage of International Patent Application No. PCT/GB2018/052129 filed Jul. 27, 2018, entitled "POSITIONING SYSTEM," which claims priority to British Patent Application No. 1712135.1 filed Jul. 27, 2017, entitled "POSITIONING SYSTEM," both of which are herein incorporated by reference in their entirety.

This invention relates to a positioning system for determining the location of an object. A virtual representation of the object could then be simulated and displayed at a respective location in a virtual world.

Such a positioning system has application in a number of areas including in virtual reality systems (e.g. in virtual reality gaming) where a participant uses a wearable computer such as a head-mounted display (HMD) to experience an immersive representation of a computer-generated simulation of a virtual world. For example, in virtual reality gaming one or more participants can experience being in a three-dimensional environment and interacting with each other as well as with that environment during a game. In these virtual reality systems, the users cannot view the real world and can only view the computer-generated simulation of the virtual world.

While some virtual reality worlds can be completely made up, others can include virtual representations of real objects present in the environment in which the user is experiencing the virtual reality world and with which the users can interact. The use of wearable computers is advantageous in that it allows hands-free manipulation of real objects, however, because virtual reality displays are completely immersive, the users cannot directly see the objects. As such it is necessary for these systems to be able to track the movements and locations of such objects in the real world so that their virtual representations in the virtual reality world can be updated. Equally, these systems need to be able to update the view of the user as they move around the environment.

Another area where such a positioning system would be useful would be in augmented reality systems where a participant wears a see-through display (or views video of the real world with an opaque display) that allows graphics and/or text to be projected in the real world.

A variety of sensing systems can be used to automatically determine the location of objects and users in the environment. For example, a satellite positioning system such as GPS could be used. However, these systems can only provide an accuracy of a few metres in outdoor environments and are unable to provide enough accuracy when the object whose location is to be estimated is indoors. In another example, a set of cameras can be placed at fixed locations around the environment to track where the object and user are located. However, such systems could fail to provide continuous real time data if part or all of an object/user becomes occluded by another object/user for a period of time. In yet another example, the object to be located may carry an acoustic transmitter with a set of acoustic receivers placed at fixed locations around the environment where the object is to be located. However, the accuracy of such systems depends on maintaining the fixed locations of the receivers which may accidentally get knocked out of place as the users interact with their environment, especially if the users cannot see the real objects while immersed in their virtual reality world. In yet another example, tracking systems comprising digital encoders can be used which can monitor the yaw, pitch and roll of an object to which they are attached. Such tracking systems can additionally comprise ball trackers, which have a ball that rolls over a surface. By monitoring the rotation of the ball using encoders the objects location can be determined using dead reckoning. By fitting a plurality of ball trackers to an object, it is possible to determine the position and orientation of the object relative to, for example the floor of the environment. Ball tracker systems, however, may need to be regularly re-calibrated as they have a tendency to drift: that is to say, provide unreliable data should one of the balls skid on the floor surface. Over time, therefore, each object would need to be returned to a known position at intervals, and reset so that accumulated errors and drift in their ball tracker's measurements can be zeroed out. The fact that the object's position measurement is susceptible to errors and drift renders ball tracker systems unreliable, or at least insufficiently robust.

As such, in terms of developing scenes for wearable computer systems displaying virtual objects, the problem of positioning of those virtual objects within the scene in such a way that they bear an accurate relation to the configuration of movable real objects in the environment is both a difficult and important technical problem to solve.

According to one aspect of the present invention there is provided a motion tracking system configured to determine a rendering of a simulation object representing a real object in a real environment, the positioning system comprising: an imaging device mounted to the real object and configured to capture a series of images of a plurality of irregularly positioned markers located in the real environment; an image processing unit communicatively coupled to the imaging device for receiving the series of images; the image processing unit being configured to determine the real location of the real object by: creating a three-dimensional model of a constellation formed by the markers visible in the series of images; and mapping the patterns of markers visible in successive images captured by the imaging device to the model and thereby determining the motion of the imaging device relative to the markers; and to determine the rendering of the simulation object so that the rendering mimics the determined motion of the imaging device.

The processor may be configured to detect in the series of images the representation of each of the plurality of irregularly positioned markers located in the real environment and determine the said real location of the real object by comparing the locations of representations of the markers in the series of images captured at different times.

The processor may be configured to detect the representation of each of the markers in the series of images as a relatively high brightness region of the image.

The markers may be retroreflective. The markers may be substantially identical. The markers may be located on a downwards-facing surface of the environment.

The imaging device may be fixed to a wearable display. The wearable display may have its own imaging device by which its location is estimated. The wearable display may be a head-mounted display visible to a wearer of the wearable display. The imaging device may be fixed to the wearable display in an orientation such that when the wearable display is worn normally with the wearer's head in an upright orientation the centre of the imaging device's field of view is directed upwards.

The processor (which may be a second processor) may be configured to cause an image on the display to pan and/or tilt in correspondence with motion of the wearer's head as detected by the processor. The processor (which may be a second processor) may be configured to cause an image on the display to display a virtual reality image of an environment simulating motion through the environment in correspondence with motion of the wearer as detected by the processor.

The imaging device may be fixed to an object. The imaging device may be fixed to the object in an orientation such that the centre of the imaging device's field of view is directed upwards. The imaging device may be fixed to a mount offset from an object. The imaging device may be a camera.

The position of the wearable display may be estimated by means of the three-dimensional model of the constellation formed by the markers visible in the series of images.

When the wearable display is worn in its normal orientation, the imaging device may be oriented such that the centre of the imaging device's field of view is directed upwards.

According to a second aspect there is provided a method for tracking the motion of a real object in a real environment for a rendering of a simulation object representing the real object in the real environment, the method comprising: capturing by means of an imaging device a series of images of a plurality of irregularly positioned markers located in the real environment; receiving by means of an image processing unit communicatively coupled to the imaging device the series of images; the image processing unit being configured to determine the real location of the real object by: creating a three-dimensional model of a constellation formed by the markers visible in the series of images; and mapping the patterns of markers visible in successive images captured by the imaging device to the model and thereby determining the motion of the imaging device relative to the markers; and determining the rendering of the simulation object so that the rendering mimics the determined motion of the imaging device.

According to a third aspect there is provided a virtual reality system comprising: a wearable display configured to display a computer-generated simulation of a virtual world; an object, the computer-generated simulation of the virtual world including a virtual representation of the object; and the positioning system of any of claims 1 to 15, the positioning system being operatively coupled to the wearable display and to the object and configured to determine a rendering simulation of the object and to render the simulation object on the wearable display from the viewpoint of the wearable display.

The present invention will now be described by way of example with reference to the accompanying drawings in which.

Figure 1:
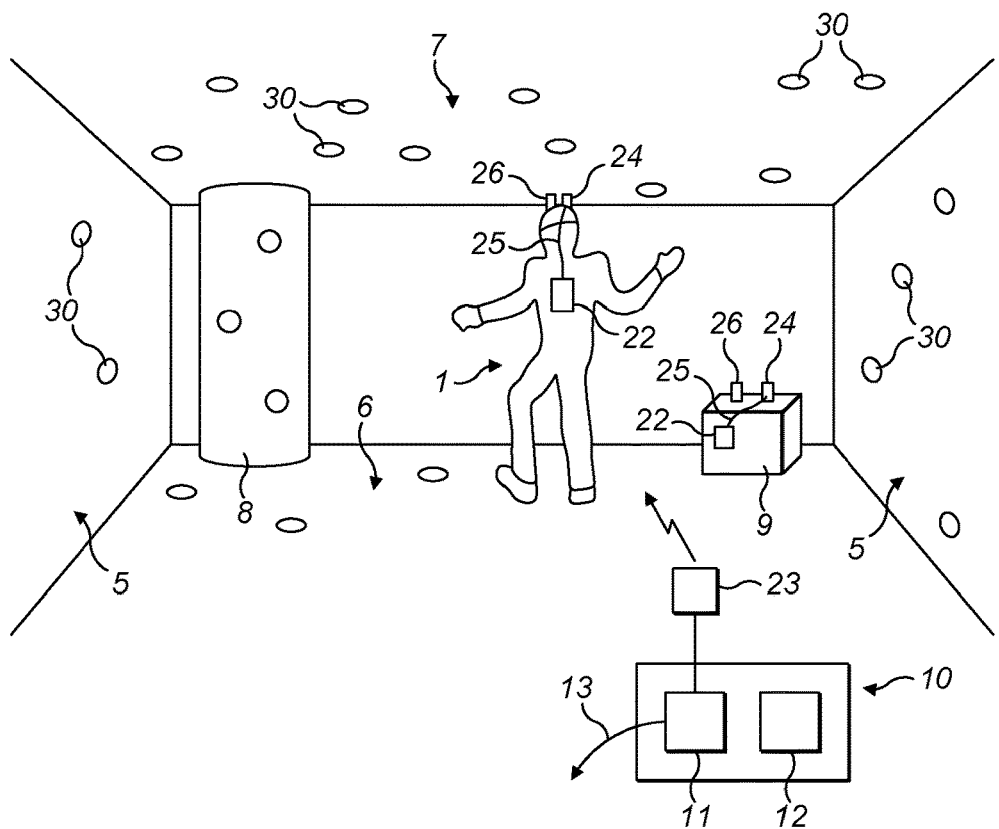
FIG. 1 is a schematic diagram of a system for sensing the motion of an object.

In the motion tracking or positioning system to be described below, a real world environment comprises one or more wearable computers such as a head-mounted display and one or more objects which are to be rendered as virtual objects in a virtual world and subsequently displayed to a user by the wearable computer. An HMD is a display device worn on the head. The HMD may for example take the form of a headset or glasses or a helmet. The HMD may comprise one or more displays positioned so that when the HMD is properly worn by a user the or each display projects images into one or both of the user's eyes. The HMD may block or restrict the user's view of the real world. In this way, the HMD can provide the user with a sensation that he is in an environment other than that where he really is. The HMD may comprise one or more see-through displays which allow the user to view the real world as well as projecting images into one or both of the user's eyes. The HMD may comprise one or more video based see-through displays which are opaque displays that use cameras mounted near the user's eyes to present live video on the display fused with virtual images to create a video-based augmented reality environment. The images projected to each eye by the HMD may differ so as to give a sensation of depth. The HMD may have a single display which projects images to both of the user's eyes, or there may be a respective display in front of one or each eye of the user. To provide the user with a virtual world in which the real objects are synthesized and rendered to represent their real world locations with respect to the user, a positioning system is provided which can be coupled with the one or more HMDs and objects and which tracks and determines the user's head position and angle as well as the location (i.e. position, orientation, and translation) of the real objects by tracking a plurality of markers 30 placed around the real world environment using image processing techniques (the details of which will be described in more detail below).

The HMDs and objects are each equipped with one or more sensors such as imaging devices that are capable of sensing the environment around them. For example, the imaging devices capture a series of images from the environment in such a way as to include images of at least some of the markers 30 placed around the environment. An image processor analyses the series of images captured by each of the imaging devices to create a three-dimensional model of a constellation formed by the visible markers 30 in the series of captured images. The image process can subsequently use this three-dimensional model to compare the positions of the images of the markers 30 in successive frames of the series of captured images to build up a record of where in three-dimensional space the actual markers 30 are. Common spatial relationships between a number of markers 30 appearing in subsequent frames can then be used to infer that, for example, the imaging device has undergone translation between those images without rotation or tilting. Thus, the location of the HMDs and objects equipped with the imaging devices can be determined within the real environment. This information is then used to render a virtual representation of the objects in respect of the position and vantage point of each of the HMDs, preferably in real time. The HMDs can additionally be equipped with tracking sensors that detect changes of angle and orientation of the HMD. Such data can then also be used to generate appropriate computer-generated imagery (CGI) which is indicative of the user's head angle at a particular time. In this way, the user is able to look around the virtual reality environment simply by moving their head without the need for a separate controller to change the angle of the CGI being displayed on the HMD.

A specific example of this positioning system is now described. FIG. 1 shows a user 1. The user 1 is in an environment which contains and/or is bounded by a number of objects which are static with respect to the environment. In this example, the objects are walls 5, floor 6 and ceiling 7 bounding the environment, and a pillar 8 located in the environment. Each of the static objects has a surface which is exposed to the environment. The environment also contains non-static objects 9 which can move while the user 1 is in the environment.

Figure 2:
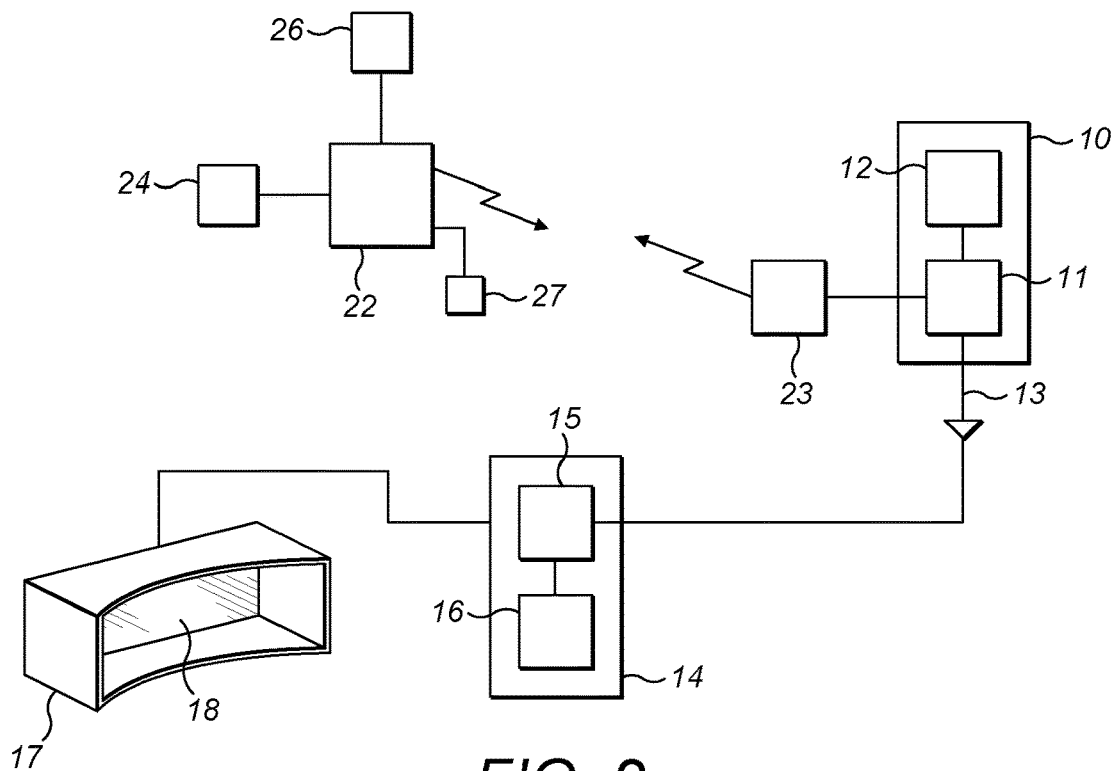
FIG. 2 is a simplified diagram of a virtual/augmented reality system.

The user 1 is equipped with a wearable computer such as HMD 17 (shown in FIGS. 2 and 6). The HMD 17 has a body intended to be worn on the head of the user. The body has an outer surface which faces the environment when worn. The body also has an internal surface defining one or two display areas in which one or two small display units 18 are mounted for displaying the virtual reality world to the user. The display units are miniaturised and may include cathode ray tubes (CRT), liquid crystal displays (LCDs), liquid crystal on silicon (LCoS), or organic light-emitting diodes (OLED). The body is secured to the head of the user using adjustable attachment means such as an adjustable strap 41. One or more sensors are mounted to the HMD for sensing the real environment. In this example one of the sensors is an imaging device such as a camera 24 mounted on the outside surface of the HMD 17. The camera 24 is configured to capture images in a direction generally away from the HMD's body In one example, the imaging device points generally upwards to capture images (e.g. video frames) from the environment above the user's head (e.g. ceiling 7).

The HMD may additionally be equipped with an attitude sensor (not shown) such as an optical attitude sensor for determining the attitude of the HMD 17 with respect to a point of interest in its environment. Where an optical attitude sensor is used, the optical attitude sensor suitably comprises a lighting system adapted to project a grid-like pattern of, for example, infra-red light, towards a surface. By using "invisible" light, the projected light pattern does not affect, or show up in, the series of images captured by any non-infrared imaging devices present in the system such as cameras 24. This helps reduce the processing power required to interpret the series of captured images obtained by the imaging devices and used in the positioning system. The optical attitude sensor suitably comprises a light detector, such as an infra-red camera, which can interpret the IR grid, as seen by the light detector, to ascertain the distance from the surface and the attitude of the HMD 17 relative to that surface. By providing, for example, a floor-facing optical attitude sensor in conjunction with the positioning system as described herein, the robustness of the determination of the camera's position, orientation and elevation can be improved.

Additionally or alternatively, the attitude sensor may be combined with an inertial measurement unit (IMU) comprising one, all or a combination of gyroscopes, accelerometers, magnetometers, and barometers. The attitude sensor may be rigidly affixed to the HMD 17. An IMU, in certain circumstances, can provide a very accurate, and almost instantaneous, measurement of the HMD's attitude. However, IMUs are susceptible to "drift" over a period of time. On the other hand, a positioning system, such as that described herein, is more accurate, over time, but due to the computation involved, can be slower to react. Therefore, by combining an IMU with a positioning system as described herein, the invention can provide the best of both worlds, that is to say, the option to cross-compare the outputs to provide correction of one system or the other in real time.

In the positioning system of FIG. 1, markers 30 are applied to the objects 5 to 8 in the environment. The markers 30 are preferably of an appearance that is readily distinguishable from the environment. For example, they may be of very high reflectivity (e.g. of retroreflective material) or of very low reflectivity (e.g. having a matt black surface coating), or they may be of a defined colour, for example a specific green. When the markers 30 are of high reflectivity, preferably each one is of a material that reflects preferentially in a direction orthogonal to its major plane, as may be the case with dedicated retroreflective materials. When the markers 30 are of high reflectivity, more preferably each one is of a material that reflects preferentially in a direction parallel to the incoming light source. The markers 30 are preferably flat: for example, they may be in the form of laminar stickers applied to the surfaces of the objects 5 to 8. This can make them easy to apply in the environment. The markers 30 preferably bear no surface markings (e.g. numbers or bar codes) by which each one can be distinguished from the others. This can make the task of applying the markers 30 in the environment easier. The markers 30 may all have the same outline (e.g. round or square) or they may have different outlines. The markers 30 are positioned in an irregular pattern. The pattern is preferably non-repeating. This may be achieved by randomly positioning the markers 30 in the environment. Positioning the markers 30 in an irregular pattern can make the task of applying the markers 30 easier and also facilitates locating the subject in the environment, as will be described below. In summary, in a preferred arrangement the markers 30 are provided by identical retroreflective stickers which are applied to the environment in an irregular or random pattern. The markers 30 may all be of the same size, which may help their range to be determined as will be described further below, or of different sizes.

Figure 3:
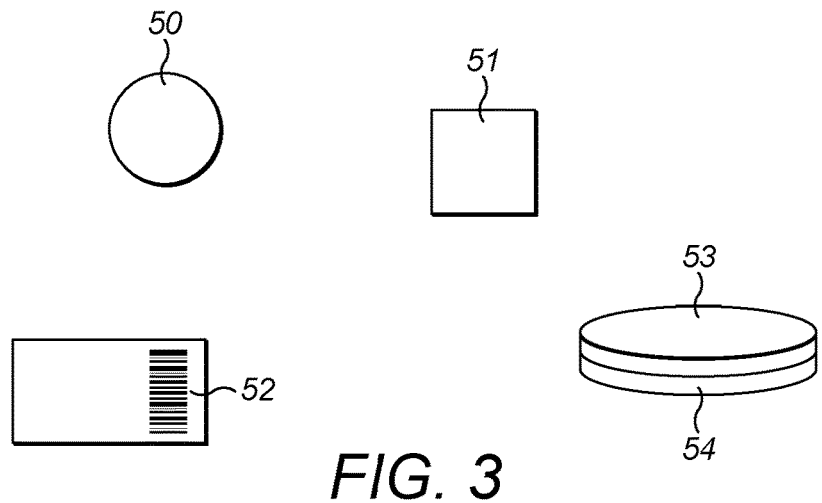
FIG. 3 shows examples of markers.

FIG. 3 shows examples of markers 30. The markers 30 could be round (see 50), square (see 51) or of other shapes. The markers 30 could bear markings such as barcode 52 or one or more holes which allow any of the markers 30 to be distinguished uniquely from the others, or they may bear no such markings. The markings may be positioned in an irregular pattern on the markers 30. Some of the markers 30 may be positioned in known locations. Conveniently the markers 30 take the form of stickers having an upper surface 53 of a predetermined colour and/or reflectivity and a lower adhesive surface 54 by means of which they may be adhered to the environment.

The markers 30 may be located on upwards-facing, downwards-facing or sideways-facing surfaces of the environment. It is preferred that at least some of the markers 30 are located on downwards-facing surfaces, e.g. ceiling 7. Such a downward-facing surface may be above the subject 1. Visibility of markers 30 located above the subject is typically better than of markers 30 located sideways of or below the subject because it is less likely to be obstructed by other objects or people.

Images (e.g. video frames) gathered by the camera 24 are passed to a control unit 10. The data may go via cables running to the control unit, or the camera 24 may be connected by cable 25 to a wireless communication device 22 carried by the user. That device may then forward the data wirelessly to a terminal 23 coupled to the controller. Optionally the camera 24 may be integrated with the communication device 22.

The camera 24 and the markers 30 enable the controller to estimate the location of the camera 24 in the environment. The manner in which this is achieved will now be described with reference to FIG. 4.

Figure 4:
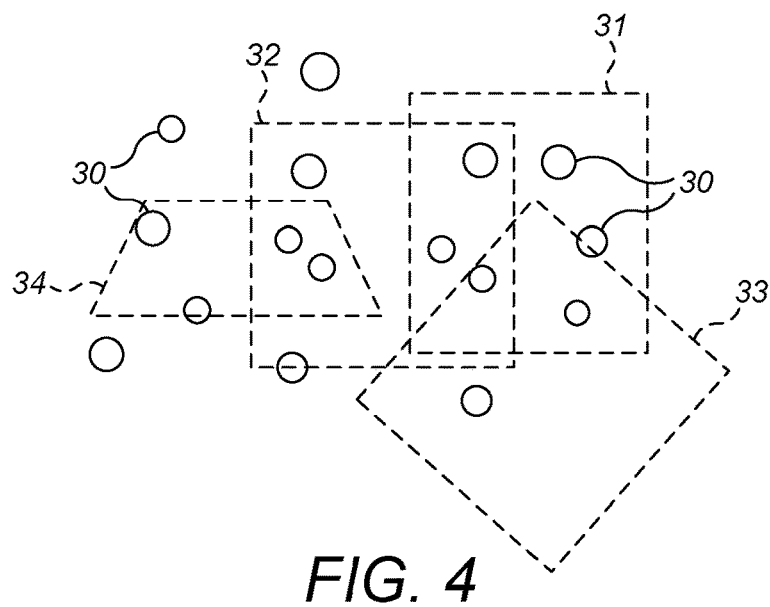
FIG. 4 shows a pattern of markers in an environment and frames captured by an imaging device.

The camera 24 captures a series of frames. The direction in which the camera 24 is pointing when it captures a frame depends on how the HMD's body is positioned at that time, and specifically on the position and orientation of the part of the HMD's body to which the camera 24 is attached. FIG. 4 shows markers 30 in an irregular pattern, and a set of outlines 31, 32, 33, 34 indicating the boundaries of frames captured by camera 24. Controller 10 comprises a processor 11 and a memory 12. The memory stores in non-transient form a set of instructions executable by the processor to perform its functions. The processor receives the successive frames captured by the camera 24. The processor analyses each frame to detect the locations of the markers 30 as represented in the frame. The markers 30 may be detected through their characteristic brightness, shape, colour or a combination of those factors. For example, in the case of retroreflective markers the markers 30 may be indicated by particularly bright pixel groups in the image.

By comparing the position and layout of the markers 30 as detected in successive frames the processor can (a) build up a map of the pattern or constellation formed by the markers 30 and (b) infer the motion of the camera 24 between frames. For illustration, suppose at a first time the camera 24 captures the image indicated at 31. The processor 11 identifies the markers 30 in that image. The markers 30 can be considered to lie on vectors extending from the camera 24 and intersecting the locations of the markers 30 as represented in image 31. At this stage the ranges of the markers 30 from the camera 24 are not known. At a second time the camera 24 captures the image indicated at 32. Some markers 30 are common to image 31 and 32. Because the markers 30 are positioned irregularly it can be assumed that the relative positions of the markers 30 found in each frame are unique in the field of markers 30. By comparing the positions of the images of markers 30 in successive frames the processor 11 can build up a record of where in a three-dimensional space the actual markers 30 are. For example, because three markers 30 appear in a common spatial relationship in frames 31 and 32 it can be inferred that the camera 24 has undergone translation between those images without rotation or tilting. Comparison of the positions of the markers 30 in frame 33 with those in the other frames 31, 32 whose fields of view overlap frame 33 permit the processor 11 to infer that the camera 24 was rotated about its primary axis before frame 33 was captured. Comparison of the positions of the markers 30 in frame 34 with those in the other frames (e.g. 32) whose fields of view overlap frame 34 permit the processor 11 to infer that the camera 24 was tilted before frame 33 was captured. Similarly, motion of the camera 24 towards or away from the field of markers 30 can be detected through scaling of the detected positions of the markers 30 between successive frames.

The accuracy of this positioning method can be improved if the camera 24 has a relatively wide field of view and/or if the density of the field of markers 30 is such that numerous markers 30 can be expected to be captured in each frame. That makes it less likely that there will be positional ambiguity due to multiple markers accidentally having a similar positional relationship and therefore being confused as between images. That also reduces the influence of other objects that might appear similar to markers (e.g. lights) and that might move. In solving for the position of the camera 24, the processor 11 searches for the best fit to the collected data, but that fit might not be perfect: for example it might not fit to a mobile light that has been mistakenly identified as one of the markers 30.

The position of markers 30 in an image indicates the direction of those markers 30 with respect to the camera 24 but not necessarily their distance from the camera 24. It may be possible for the processor 11 to infer the distance to markers 30 from the size with which they appear in the image. Alternatively, or in addition, the distance to markers 30 may be inferred from the changes in the imaged positions of markers 30 as between frames. The processor 11 solves a multi-variable problem in which the relative directions from the camera 24 to the markers 30 in successive frames are known. The processor 11 determines a map of the markers 30 that provides the best fit to the information collected in successive frames as to the directions of markers 30 from the camera 24. Having formed the map, it estimates the position of the camera 24 with reference to that map by identifying a position and orientation from which a view of the mapped markers 30 would be expected to best match the markers 30 as identified in the latest image from the camera 24. This problem can be simplified if it is known with greater confidence that the same one of the markers 30 as is represented at a location in a first frame is also represented at a location in a second frame. This relationship can be achieved by one or both of: (i) the rate at which the frames are captured being sufficiently high that one or more markers 30 will typically appear in successive frames, and can therefore be tracked by the processor; and (ii) the processor searching for common spatial patterns among the markers 30 as imaged, which indicate that the same set of markers 30 have been imaged in different frames.

It would be possible for the processor 11 to be pre-programmed with the locations of the markers 30, but it has been found that with a constellation of markers 30 of suitable density this is not necessary because the processor 11 can learn their locations satisfactorily. The pre-programmed locations of the markers 30, may be the result of a map created a priori by another processor 11 having learnt the locations of the markers 30.

It would be possible for the markers 30 to be provided with distinctive features, to help the processor distinguish the images of different markers 30 from each other. Those could for example be numbers or bar codes, or the shape or colour of different markers 30 may differ so that they can be differentiated.

Using the process described above, the processor 11 detects and tracks motion of the camera 24. As the camera 24 is fixed with respect to the HMD and in turn with respect to a first part of the user's body (e.g. the head wearing the HMD), the processor can determine the motion of that part of the body (e.g. the user's head) in the real world.

The same positioning methodology can be applied to the static as well as the non-static objects 9 of the real environment by equipping the objects with a camera 24 to capture a series of frames and passing the captured frames to the control unit 10 for further processing by processor 11.

The imaging device of the positioning system need not be directly mounted to objects of interest. In one example, the object may be equipped with other sensors e.g. an angular encoder and the camera 24 may be placed at a known distance from the object to determine the object's location. This location information can then be combined with the output produced by the other sensors (taking account of the offset between the determined location of the object and its actual location) and the results passed to the control unit 10 for further processing by processor 11. Once the processor 11 has determined the locations of the objects in the real environment, the processor 11 may transmit the determined positions of the HMD and the objects via link 13 to another device 14 (see FIG. 2). That device may use the data to control equipment such as a display or a physically movable device such as a robot in dependence on the determined positions.

In one example, the device 14 controls the video display 18 of the HMD 17 in dependence on the determined positions. This may be done in several ways. In a first arrangement, the control device 14 controls the display to show a simulation of the object 9. The simulation may, for example, be a representation of a human or object (static or moving) the locations or motions of which correspond to the detected locations or motions of the human or object. In another arrangement, the control device 14 controls a display 18 on the HMD 17 that is presumed to be carried by the user 1. In this arrangement, the control device 14 controls the HMD to display an image that changes in correspondence with the motions of the user 1 so as to provide the user with a virtual/augmented reality experience. Thus, the HMD 17 may be controlled in response to the estimated positions as determined by controller 10. The control device 14 may comprise a processor 15 and a memory 16 storing in a non-transient way, instructions that are executable by the processor to perform its functions.

One or more of the units 10, 14 and 22 may be integrated together. Alternatively, they may be remote from each other.

Figure 5:
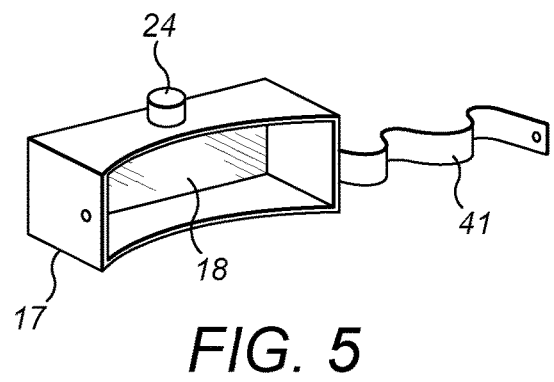
FIG. 5 shows an example of a wearable computer incorporating an imaging device such as a camera.

In order for the camera 24 to have the most reliable view of the constellation of markers 30 it is preferred that the camera 24 is located so that for normal positions of the user 1 and/or objects, the camera 24 is directed upwards. FIG. 5 shows that the camera 24 may be attached to the HMD 17. The HMD 17 may be worn by being attached around the user's head by means of strap 41.

A lamp 26 may be located near the camera 24. Preferably the lamp is configured to shine in generally the direction that the camera 24 is pointing toward. The lamp 26 may be fixed to the camera 24. When the camera 24 is fixed to a wearable computer, such as a head-mounted display 17, the lamp 26 may be fixed to the same wearable computer. The lamp 26 may emit visible or invisible (e.g. ultraviolet or infrared) light. The light emitted by the lamp 26 is preferably of a wavelength that the camera 24 can detect. When the lamp 26 is operational it may illuminate the field of view of the camera 24. This may make it easier for the controller 10 to distinguish the markers 30. For example, when the markers 30 are of retroreflective material they may show up as especially bright regions of images captured by the camera 24 due to their reflecting the light from the lamp 26.

The equipment carried by the user 1 and/or mounted to an object may conveniently be powered by a battery 27 also carried by the user and/or mounted to the object.

A further approach to calibrating the location of an object such as an accelerometer is to contact the object with a point whose location is known. The time when the object is contacted with the known location may be signalled to the controller 10, and subsequent accelerations can be integrated to provide a position offset from that known location. The known location may be fixed, or it may be a point on a moveable probe, for example a handheld probe, whose location can be sense by means such as laser ranging, measuring the angles of joints on links extending between the probe and a base or by means of a camera such as 24. The unit may alternatively be used for continuous calibration of the location of such objects and sensors.

The HMDs 17 may be configured to display augmented reality or mixed reality worlds by superimposing computer-generated imagery onto live imagery from the physical world. Combining real-world views with CGI can be done by projecting the CGI through a partially reflective mirror and viewing the real world directly. Alternatively, combining real-world views with CGI can also be done electronically by accepting video from a camera and mixing it electronically with CGI.

As well as gaming and entertainment applications, the wearable computer technology and virtual reality systems described above are applicable to other applications. These include military applications such as in aviation; industrial applications such as manufacturing, construction, testing, and maintenance; engineering applications such as the provision of stereoscopic view of computer-aided design (CAD) schemes; medical applications; sports applications; and finally training and simulation applications.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A motion tracking system comprising:
   an imaging device mounted to a real object and configured to capture a series of images of a plurality of irregularly positioned markers located in a real environment, wherein the imaging device captures the series of images at a frame rate greater than a threshold frame rate sufficient for one or more of the plurality of irregularly positioned markers to appear in successive frames of the series of images;
   an image processing unit, which includes a processor, communicatively coupled to the imaging device and configured to receive and track the series of images, the processor of the image processing unit being further configured to search for common spatial patterns among the one or more of the plurality of irregularly positioned markers tracked to determine a real location of the real object by
      creating a three-dimensional model of a constellation formed by the markers visible in the series of images, and
      mapping the patterns of markers visible in successive images captured by the imaging device to the three-dimensional model and thereby determining a motion of the imaging device relative to the markers, and
   the image processing unit configured to determine a rendering of a simulation object representing the real object in the real environment so that the rendering mimics a determined motion of the imaging device.

2. The motion tracking system as claimed in claim 1, wherein the processor is configured to:
   detect in the series of images the representation of each of the plurality of irregularly positioned markers located in the real environment; and
   determine the said real location of the real object by comparing the locations of representations of the markers in the series of images captured at different times.

3. The motion tracking system as claimed in claim 2, wherein the processor is configured to detect the representation of each of the markers in the series of images as a relatively high brightness region of an image.

4. The motion tracking system as claimed in claim 1, wherein the markers are retroreflective.

5. The motion tracking system as claimed in claim 1, wherein the markers are substantially identical.

6. The motion tracking system as claimed in claim 1, wherein the markers are located on a downwards-facing surface of the environment.

7. The motion tracking system as claimed in claim 1, wherein the imaging device is fixed to a wearable display.

8. The motion tracking system as claimed in claim 1, comprising a wearable display with its own imaging device by which its location is estimated.

9. The motion tracking system as claimed in claim 7, wherein the wearable display is a head-mounted display visible to a wearer of the wearable display.

10. The motion tracking system as claimed in claim 9, wherein the imaging device is fixed to the wearable display in an orientation such that when the wearable display is worn normally with the wearer's head in an upright orientation the centre of the imaging device's field of view is directed upwards.

11. The motion tracking system as claimed in claim 9, wherein the processor is configured to cause an image on the display to pan and/or tilt in correspondence with motion of the wearer's head as detected by the processor.

12. The motion tracking system as claimed in claim 11, wherein the processor is configured to cause an image on the display to display a virtual reality image of an environment simulating motion through the environment in correspondence with motion of the wearer as detected by the processor.

13. The motion tracking system as claimed in claim 1, wherein the imaging device is fixed to an object.

14. The motion tracking system as claimed in claim 13, wherein the imaging device is fixed to the object in an orientation such that the centre of the imaging device's field of view is directed upwards.

15. The motion tracking system as claimed in claim 1, wherein the imaging device is fixed to a mount offset from an object.

16. The motion tracking system as claimed in claim 1, wherein the imaging device is a camera.

17. The motion tracking system as claimed in claim 8, wherein the position of the wearable display is estimated by means of the three-dimensional model of the constellation formed by the markers visible in the series of images.

18. The motion tracking system as claimed in claim 8, wherein when the wearable display is worn in its normal orientation, the imaging device is oriented such that the centre of the imaging device's field of view is directed upwards.

19. A method for tracking the motion of a real object in a real environment for a rendering of a simulation object representing the real object in the real environment, the method comprising:
  capturing, with an imaging device, a series of images of a plurality of irregularly positioned markers located in the real environment, wherein the imaging device captures the series of images at a frame rate greater than a threshold frame rate sufficient for one or more of the plurality of irregularly positioned markers to appear in successive frames of the series of images;
  receiving and tracking, with an image processing unit, which includes a processor, communicatively coupled to the imaging device, the series of images;
  wherein the processor of the image processing unit is configured to search for common spatial patterns among the one or more plurality of irregularly positioned markers tracked to determine the real location of the real object by
  creating a three-dimensional model of a constellation formed by the markers visible in the series of images, and
  mapping the patterns of markers visible in successive images captured by the imaging device to the model and thereby determining the motion of the imaging device relative to the markers;
  and determining, with the imaging processing unit, the rendering of the simulation object so that the rendering mimics the determined motion of the imaging device.

20. A virtual reality system comprising:
  a wearable display configured to display a computer-generated simulation of a virtual world;
  an object, the computer-generated simulation of the virtual world including a virtual representation of the object; and
  a motion tracking system that comprises:
    an imaging device mounted to the real object and configured to capture a series of images of a plurality of irregularly positioned markers located in the real environment, wherein the imaging device captures the series of images at a frame rate greater than a threshold frame rate sufficient for one or more of the plurality of irregularly positioned markers to appear in successive frames of the series of images;
    an image processing unit, which includes a processor, communicatively coupled to the imaging device for receiving and tracking the series of images, the processor of the image processing unit being configured to search for common spatial patterns among the one or more plurality of irregularly positioned markers tracked to determine a real location of the real object by
      creating a three-dimensional model of a constellation formed by the markers visible in the series of images, and
      mapping the patterns of markers visible in successive images captured by the imaging device to the three-dimensional model and thereby determining a motion of the imaging device relative to the markers, and
    the image processing unit configured to determine the rendering of the simulation object so that the rendering mimics the determined motion of the imaging device,
  wherein the motion tracking system is operatively coupled to the wearable display and to the object and is configured to determine a rendering simulation of the object and to render the simulation object on the wearable display from the viewpoint of the wearable display.

* * * * *